Jan. 14, 1969    C. R. LINSLEY    3,422,412

SUPPORT ASSEMBLY FOR AN AIR BEARING MAGNETIC HEAD

Filed Dec. 2, 1965    Sheet 1 of 2

INVENTOR.
CLARENCE R. LINSLEY

BY

ATTORNEY

Jan. 14, 1969    C. R. LINSLEY    3,422,412
SUPPORT ASSEMBLY FOR AN AIR BEARING MAGNETIC HEAD
Filed Dec. 2, 1965

United States Patent Office 3,422,412
Patented Jan. 14, 1969

3,422,412
SUPPORT ASSEMBLY FOR AN AIR BEARING MAGNETIC HEAD
Clarence R. Linsley, La Crescenta, Calif., assignor to General Precision Systems Inc., a corporation of Delaware
Filed Dec. 2, 1965, Ser. No. 511,156
U.S. Cl. 340—174.1        6 Claims
Int. Cl. G11b 5/00

ABSTRACT OF THE DISCLOSURE

A mounting assembly for supporting a magnetic transducer on the laminar gaseous bearing created by a moving memory surface. A bifurcated biasing spring attached to a stationary member has holes in the tine ends which engage the equators of balls coupled to the top surface of the transducer bearing pad to provide a coupling which permits the transducer to assume any reasonable flying attitude without moving its position with relation to the moving surface. This spring, which acts to force the transducer toward the moving surface, is maintained at the equators of the coupling balls by a wedge connected to the top surface of the transducer bearing pad. The vertex of this wedge supports the spring at the equators of the balls and also provides a fixed pivot pin between the spring tines and the transducer.

---

This invention relates to transducer assemblies which float upon a gaseous bearing created on a rotating memory surface and are used for the dynamic transfer of data to and from the memory, and more particularly, to an improved transducer assembly having means for pivotally mounting a spring means to a transducer carrying member of the transducer assembly, thus allowing ease in movement of the transducer carrying member normal to the moving surface of the rotating memory.

Novel transducer mountings have been developed in which the transducer is mounted in a spring pressed shoe which rides or floats on a thin gaseous film between the transducer and the surface of the rotating memory. Such transducer mountings are described in U.S. Patents Nos. 3,177,495 and 3,197,751 issued to John A. Felts on Apr. 6, 1965 and July 27, 1965, respectively, and in the copending application Ser. No. 501,899 for "Transducer Assembly," John A. Felts, inventor, filed Oct. 22, 1965. These spring pressed floating transducer mountings succeed in placing the recording or air gap section of the transducer in very close proximity to the recording disc.

Heretofore, transducers have been assembled with rigid alignment pins laterally affixed to the surface of the shoe to which the spring means have been attached. Such rigidity between these elements tends to impede the transducer assembly's motions normal to the surface of the recording medium.

It is desired that the transducer be allowed free and easy movement normal to the surface of the disc (which is called "pumping" movement) and the reason is that if runout or wobble occurred in the moving memory surface and the floating transducer were not allowed to "pump," a collision might occur between the surface of the disc and the shoe. Such collisions could cause the surface of the disc to be ruined and also the data stored thereon may be lost.

Briefly described, the present invention provides a transducer carrying member with at least one transducer mounted thereon capable of floating upon a gaseous bearing created by a moving memory surface. A spring means is provided for biasing the carrying member towards the moving surface and a means is provided for assuring the pumping action between the transducer and the moving memory surface by providing a single line or point contact pivoting between the spring means and the carrying member.

It is one object of this invention to provide a transducer assembly with pivotal co-action between the spring biasing means and the transducer carrying member or shoe.

Another object of this invention is to provide a transducer assembly which prevents wear between co-acting and pivotally engaged parts.

In the drawings, which illustrate one embodiment of the invention:

Figure 1:
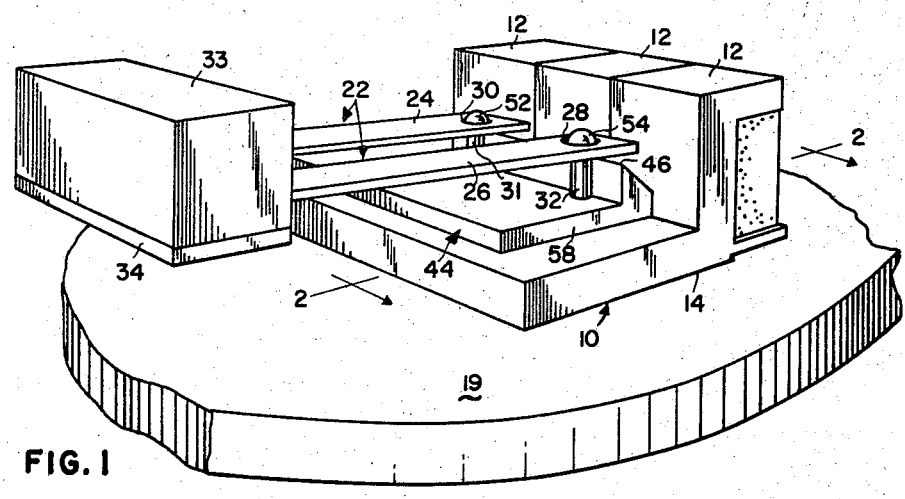
FIGURE 1 is a perspective view of a transducer assembly illustrating one embodiment of this invention.

Turning now to a detailed description of one preferred embodiment of this invention; a transducer assembly 10 comprises a plurality of transducers or heads 12 mounted to a shoe 14. The heads 12 are placed near the rear section or trailing edge of a bearing pad 16, thus permitting a recording gap 18 of head 12 to be placed near the intercept point of the bearing 16 and the recording surface of a rotating memory disc 19, as is fully explained in Patent No. 3,197,751 supra.

Figure 2:
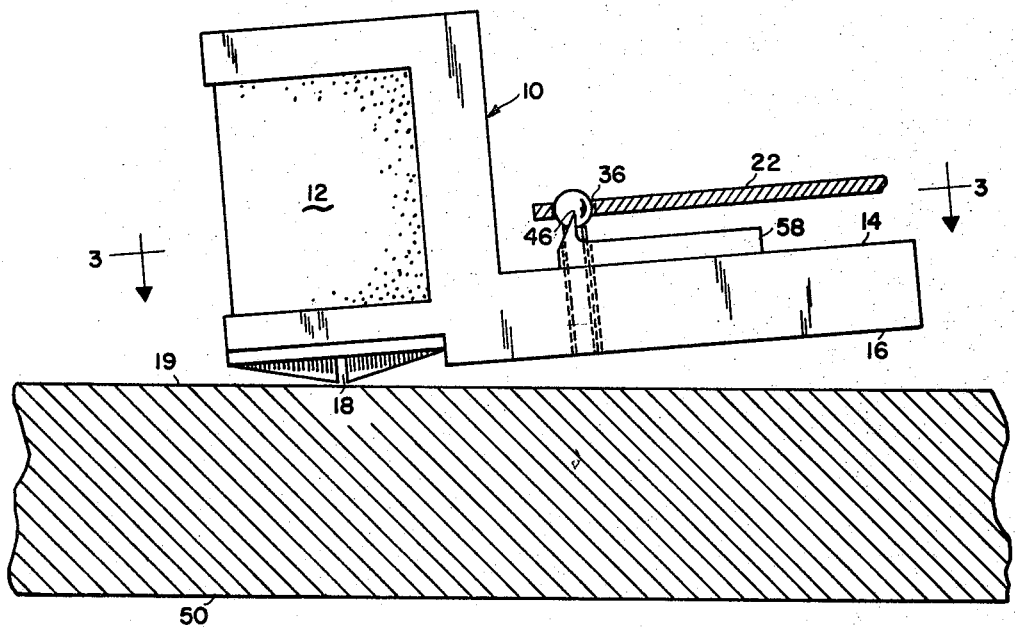
FIGURE 2 is a sectional elevation view of the embodiment taken along the lines 2—2 of FIGURE 1.
Figure 3:
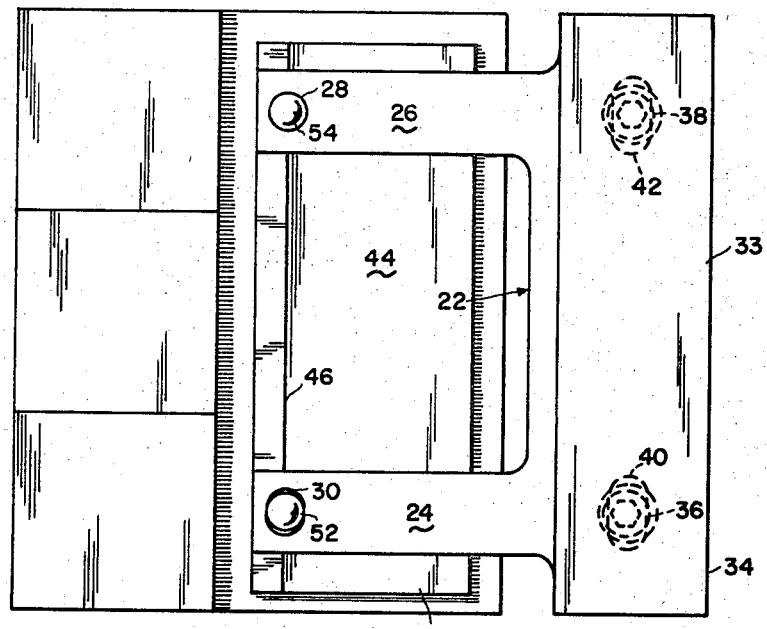
FIGURE 3 is a plan view of this invention taken along the lines 3—3 of FIGURE 2.

A leaf spring 22 resiliently bears upon the shoe 14 forcing it towards the surface of disc 19, and thus fixes its angle of attack therewith. Spring 22 is the well-known bifurcated type which has a pair of tines 24 and 26 with openings 28 and 30 to receive pins 31 and 32 affixed in the shoe 14. Each of these pins 31 and 32 has a ball firmly affixed to their top surface. One of the openings 30 may be elongated, as shown in FIGURE 2, to provide for lateral adjustments and for dimensional changes which may take place should different materials be used in the assemblies, and for other well-known reasons. Leaf spring 22 has the other end thereof affixed to a stationary mount such as mount block 33 in FIGURES 1 and 3. Spring 22 is held to the mount block 33 by a plate 34 and secured by the bolts 36 and 38. Plate 34 has a pair of holes 40 and 42 to receive bolts 36 and 38 and these holes may also be elongated to provide for adjustments and positioning of the spring 22.

An adjustable bearing means 44 consists of a wedge 46 integral with a flat body 58 which is permanently affixed to the top surface of shoe 14. Bearing means 44 may be placed upon shoe 14 in any position which assures proper positioning of the point of application of the force of the leaf spring upon wedge 46 to insure that the recording gap 18 is positioned proximate the intercept point established between bearing pad 16 and disc 19, as shown in FIGURE 2.

Figure 4:
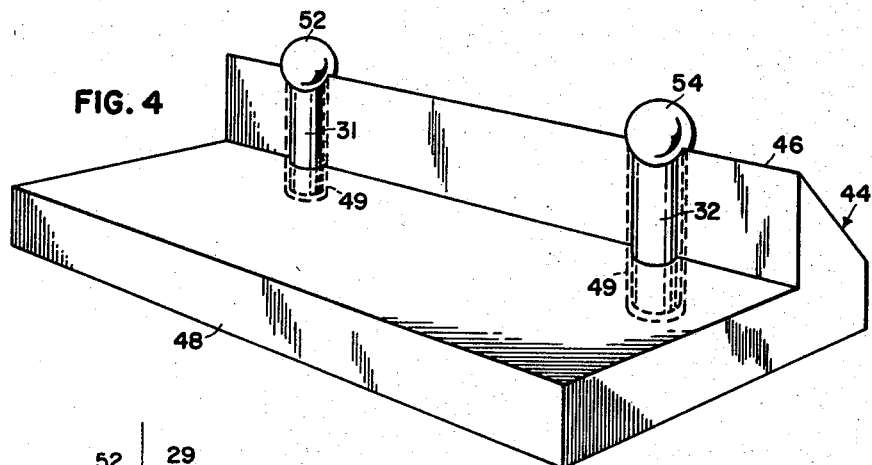
FIGURE 4 is a perspective view of the invention showing the pivotal points between the spring means and the shoe.
Figure 5:
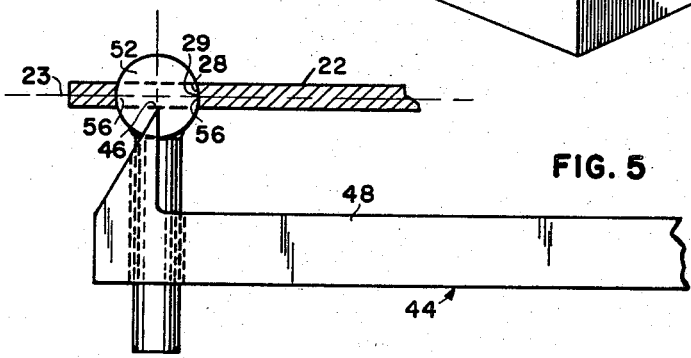
FIGURE 5 is a fragmentary section view showing the positions of the pivot points of this invention.

Wedge 46, as shown in FIGURE 4, has a pair of holes 49 drilled therein to allow the alignment pins 31 and 32 to protrude from the shoe 14 therethrough and intercept the exact center of the vertex of the wedge 46. Such holes 49 should be drilled sufficiently large enough to allow any adjustment which may be necessary of the bearing means, as described in the co-pending application Ser. No. 501,899 for "Transducer Assembly," John A. Felts, inventor, filed Oct. 22, 1965, supra. A pair of balls 52 and 54 are permanently affixed to the tops of pins 31 and 32. This may be done by cement or the like. Such positioning of the balls should be sufficiently placed below the vertex of the wedge 46 to assure that when the leaf spring 22 contacts the vertex of wedge 46 the cross-sectional center 23 of the leaf spring 22 will intercept at the exact equator of the balls 52 and 54, as shown in FIGURE 5.

The holes which are placed in the leaf spring 22 can now be drilled to close tolerance as by sizing to allow and assure the required dimensional stability wherein no matter what the angle the leaf spring 22 assumes with relation to the shoe and surface of the disc, which is constantly changing by the pumping action therebetween, the exact center and only contact point between the balls 52 and 54 and the leaf spring tines 24 and 26 is at point 29 which is the exact center of the cross-section of the tines and which only contacts the exact equator of the ball 52. Thus, no matter what the angle is, there is only a single line contact at all times. Thus it can be seen that there will be no elongation of the holes in the tines due to the wearing by the pumping action, as occurs if the normally employed rigid pin is used. For instance, if the disc is the type which is positioned on end, the transducers will not wander over the surface of the disc, and thus the recording gap 18 of the transducer head will not interfere or cross over to tracks of information not predicated with that particular head.

Thus, having explained one embodiment of this invention, what is claimed is:

1. A transducer assembly for rotating memories comprising:
   a transducer carrying member capable of floating upon a gaseous bearing created upon a moving surface;
   a leaf spring having one end mounted to a stationary member and having in the other end a hole adapted for coupling with said carrying member, said spring urging said carrying member toward the moving surface; and
   at least one connecting member mounted upon said carrying member on the side opposite the moving surface,
      said connecting member comprising a pin having one end coupled to said carrying member and the other end supporting a spherical ball adapted to pivotally engage the hole in said leaf spring.

2. A transducer assembly, as defined in claim 1, including:
   means for maintaining said leaf spring from direct contact with said transducer carrying member.

3. A transducer assembly, as defined in claim 2, wherein said means for maintaining said leaf spring from direct contact with said transducer carrying member is a bearing means for providing a frictionless knifelike edge between said carrying member and said spring means, said bearing means being fixedly mounted to said carrying member on the side opposite the moving surface, said bearing means having an opening through the bearing means to receive said pin and said ball so that the cross-sectional center of said leaf spring is always at the equator of said ball means.

4. A transducer assembly, as defined in claim 1, including:
   a support mounted stationary with respect to said moving surface, and wherein;
   said transducer carrying member is capable of carrying a plurality of transducers for simultaneously transfering data to and from a plurality of data tracks upon the moving surface,
   said leaf spring is a bifurcated leaf spring having a pair of resilient tines, each of said tines having a hole located at its extreme ends, said leaf spring fixedly attached to said support at the ends opposite said tines,
   said connecting member comprises a pair of alignment pins mounted to said carrying member on the side opposite the moving surface and extending normal to said carrying member,
   a ball pivot fixedly attached to each said alignment pins, the tines of said bifurcated leaf spring pivotally mounted to said ball pivots by fitting the holes thereof over said ball pivots; and
   means for maintaining the cross-sectional center of said leaf spring at the area defining the holes near an equator of the ball means.

5. A transducer assembly, as defined in claim 4, wherein said means for maintaining the cross-sectional center of said leaf spring near the area defining the holes near an equator of the ball is a bearing means for providing frictionless contact against said bifurcated leaf spring at a point near the center line of said ball pivot, said bearing means mounted to said carrying means with said alignment pins.

6. A transducer assembly, as defined in claim 5, wherein one of the holes in one of the tines of said bifurcated leaf spring is elongated to provide for lateral adjustments and for lateral expansion.

References Cited

UNITED STATES PATENTS

| 3,197,751 | 7/1965 | Felts | 179—100.2 |
| 3,177,495 | 4/1965 | Felts | 340—174.1 |
| 3,170,149 | 2/1965 | Koskie et al. | 340—174.1 |

BERNARD KONICK, *Primary Examiner.*

A. I. NEUSTADT, *Assistant Examiner.*

U.S. Cl. X.R.

179—100.2